United States Patent [19]

Shimazaki

[11] Patent Number: 4,731,618

[45] Date of Patent: Mar. 15, 1988

[54] CONTROL METHOD FOR THERMAL RECORDING

[75] Inventor: Osamu Shimazaki, Kaisei, Japan

[73] Assignee: Fuji Photo Film Co., Ltd., Minami-Ashigara, Japan

[21] Appl. No.: 23,108

[22] Filed: Mar. 6, 1987

[30] Foreign Application Priority Data

Mar. 13, 1986 [JP] Japan .................................. 61-55911

[51] Int. Cl.[4] .......................... G01D 15/10; B41J 3/20

[52] U.S. Cl. ................................ 346/1.1; 346/76 PH; 400/120

[58] Field of Search ........................... 346/1.1, 76 PH; 400/120

[56] References Cited

U.S. PATENT DOCUMENTS 4,216,481 8/1980 Hakoyama ..................... 346/76 PH 4,454,516 6/1984 Moriguchi et al. ............ 346/76 PH 4,475,112 10/1984 Washio et al. ....................... 346/1.1

*Primary Examiner*—E. A. Goldberg

*Assistant Examiner*—Gerald E. Preston

*Attorney, Agent, or Firm*—Wenderoth, Lind & Ponack

[57] ABSTRACT

In the prior art thermal recording systems heat resistor elements incorporated in a thermal head are controlled in the unit of dots, and a large volume of electric current is needed specially when the electric current is simultaneously applied on a large number of heat resistor elements in one line. This necessitates an expensive power source device for the system. The present invention method can reduce electric current to be fed to the thermal head as it drives several blocks of the thermal head at one time to thereby achieve recording of one line of data at a higher speed because this method comprises the steps of dividing a plurality of heat resistor elements of the thermal head into several blocks, counting the number of recording heat resistor elements in each of the blocks, summing the number of the recording heat resistor elements in plural blocks sequentially from the first block, and applying electric current on plural blocks at the same time in a manner that the summed number is not more than a predetermined value.

8 Claims, 6 Drawing Figures

CONTROL METHOD FOR THERMAL RECORDING

BACKGROUND OF THE INVENTION

This invention relates to a control method for thermal recording using a line-type thermal head which comprises a plurality of heat resistor elements.

A line-type thermal head has long been used in a conventional thermal recording system wherein a plurality of heat resistor elements incorporated in the thermal head are respectively controlled in the unit of dots for recording. When electric current are to be applied to many heat resistor elements in a line simultaneously for high-speed recording, however, the thermal recording system needs power source of a large capacity which inevitably pushes the cost of the power source device up. A solution has long been required for the above problem in the thermal recording system.

The above matter is applicable to both the thermographical recording which transfers images from an ink ribbon onto a sheet of plane paper by thermally melting the ink and for the thermal recording system which directly records image data on a heat-sensitive paper sheet with a thermal head.

SUMMARY OF THE INVENTION

This invention was contrived to eliminate aforementioned problems encountered in the prior art and aims at providing a control method which allows recording with a line-type thermal head at a higher speed and with a lower cost.

According to one aspect of this invention, for achieving the object described above, there is provided a recording control method for thermal recording which records image data on a recording medium with a line-type thermal head which comprises a plurality of heat resistor elements, which comprises the steps of dividing said heat resistor elements of said line-type thermal head into blocks in the number N, counting the number of recording heat resistor elements in each block, respectively summing the number of the recording heat resistor elements for each block in a predetermined direction, sequentially recording data in a unit of one line by applying electric current to the recording heat resistor elements of each block simultaneously in a manner that the summed number is not more than a predetermined value, and controlling amount of displacement of said recording medium with the number of groups of the blocks which record simultaneously and said divisional number N.

According to another aspect of this invention, there is provided a recording control method for thermal recording which records image data on a sheet of recording paper with a line-type thermal head which is divided into the number of N, which comprises the steps of: setting a divisional number Y at "1" and increasing a block counting value by [+1]; judging whether or not a block counting value X is smaller than a divisional number N; if the block counting value is smaller than the divisional number N, the block counting value is added to a value A of recording dots in an x-th block; making the sum or [Z+A] to a counted value of the recording dots; judging whether or not the counted value Z is or less than a predetermined value; repeating above operations if the counted value Z is smaller than said predetermined value; increasing said divisional number Y by [+1], renewing the number of said recording dots to the value A and repeating above operations if the counted value Z is larger than said predetermined value; computing amount of conveyance of said recording paper if said block counting value X is larger than said divisional number N; and determining time for conveying said recording paper and the numberof said recording blocks.

The nature, principle and utility of the invention will become more apparent from the following detailed description when read in conjunction with the accompanying drawings.

DESCRIPTION OF THE PREFERRED EMBODIMENTS

Figure 1:
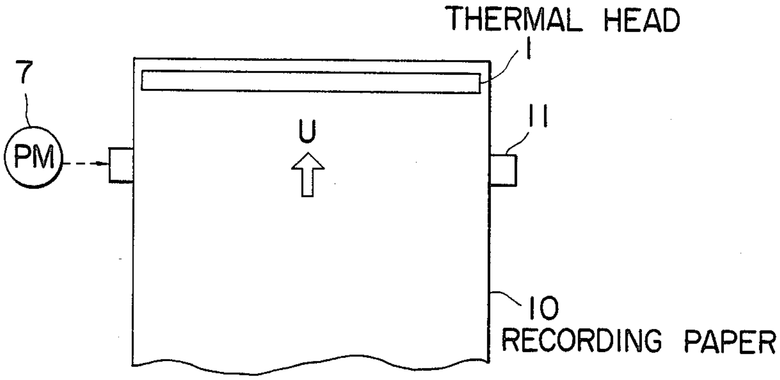
FIG. 1 is an explanatory view of a thermal head recording according to this invention.

FIG. 1 shows an aspect of the thermal recording according to this invention wherein a fixed line-type thermal head 1 which comprises a plurality of heat resistor elements (not shown) conducts recording on a recording paper 10 for one line (main scanning), and then the recording paper 10 is conveyed by one line in the direction U (auxiliary scanning). By repeating the above main and auxiliary scannings, the whole surface of the recording paper 10 will be recorded with images such as pictures, characteres and so on. The recording paper 10 may be conveyed with rollers 11, etc. driven by a pulse motor 7.

Figure 2:
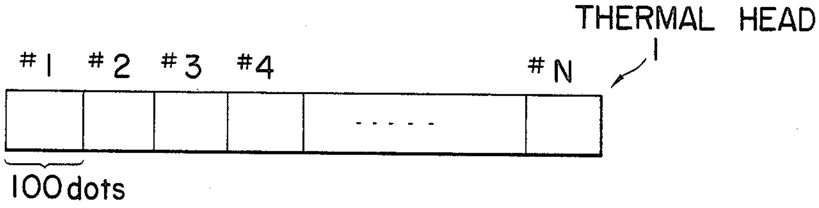
FIGS. 2 and 3 are charts to describe the principle of this invention.
Figure 3:
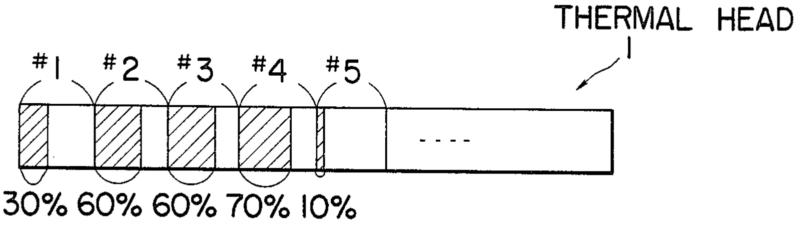
Figure 4:
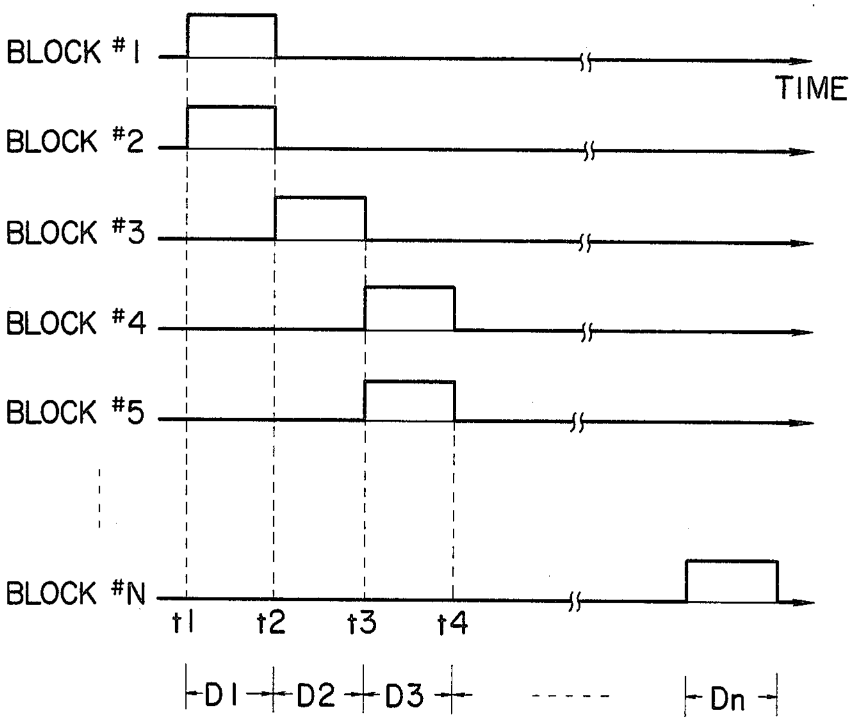
FIG. 4 is a timing chart to show driving of the thermal head according to this invention.

FIG. 2 shows a case wherein the heat resistor elements of the line-type thermal head 1 is divided into blocks #1 throug #N, and the number of heat resistor elements or picture elements in each block comprises 100 dots. Accrding to this invention which is shown in FIG. 3, the number of recording dots or heat resistor elements which should be applied with electric current is counted for each block, and several of the blocks are applied with the electric current simultaneously in a manner that the sum of the counted numbers in the blocks remains below 100% (or less than 100 in terms of dot number). More particularly, in the case shown in FIG. 3, as the number of the recording dots in the block #1 is 30% while that of the block #2 is 60%, the sum of the blocks #1 and #2 remains short of 100%. Therefore, both blocks are applied with the electric current simultaneously at time points t1 to t2 as shown in FIG. 4. Since the number of recording dots of the block #3 is 60% while that of the block #4 is 70%, and the sum of the dots in both blocks exceeds 100%, the block #3 alone should be driven at time points t2 to t3. But as the sum of the recording dots in the blocks #4 and #5 which are 70% and 10% respectively remains short of 100%, at time points t3 and t4 both of the blocks #4 and #5 are driven at the same time.

By driving plural blocks at the same time within a certain limit; i.e. in a manner that the sum of recording dots remains short of a predetermined value (100%), the number of times to apply the electric current or the number of driven sections D1, D2, . . . Dn can be made smaller than the number of blocks. This can enhance the recording speed of the thermal head 1 per line. Even in plural blocks are driven by the current simultaneously, as the ratio of the recording dots against unrecording dots remains less than 100%, the capacity of the driving device for the thermal head needs not to be increased and therefore the device itsef can be constructed at a lower cost.

Although the number of picture elements or heat resistor elements in each block is described as 100 dots in the above statement, the number of dots may be selected arbitrarily, and driving sections can be divided into an arbitrary number for computation so long as the number of recording dots or heat resistor elments accomodates the current capacity of the thermal head.

Figure 5:
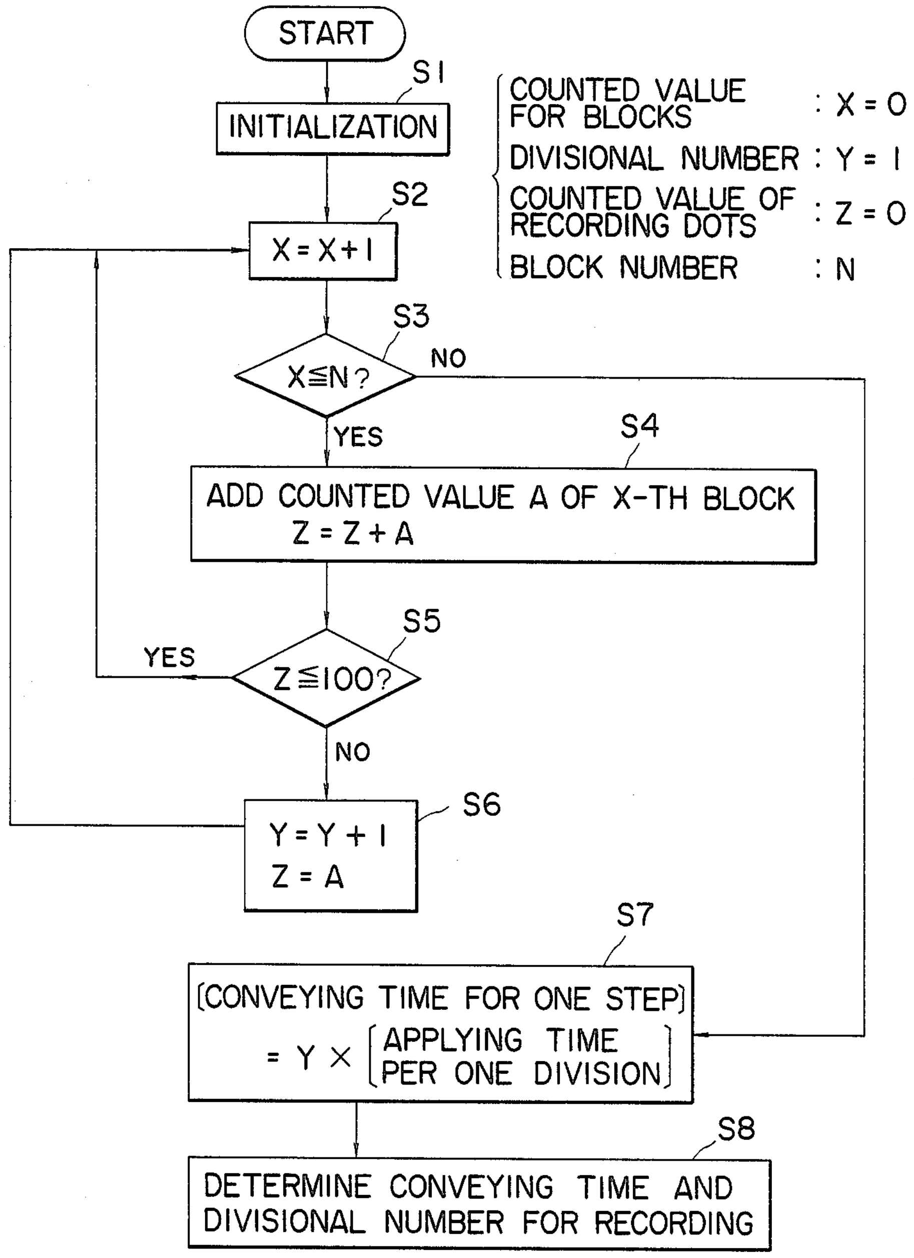
FIG. 5 is a flow chart to show an embodiment of this invention.

FIG. 5 is a flow chart to show the control method of the thermal head 1. At initialization for operation (Step S1), the counted value X for the blocks is initialized to "0", and the counted value Z of recording dots is also cleared to "0". The divisional number Y for the thermal head 1 is set at "1". At the above Step S2, one "1" is added to the counted value X for the blocks, the value X of the particular block is judged whether or not it is less than the divisional number N (Step S3), and if it is less than the divisional number N, it is added to a counted value A of the recording dots in the X-th block to make [Z+A] the counted value (Step S4). The counted value Z is then judged whether or not it is less than a predetermined value "100", and if it is smaller than "100", the operation is returned to the above Step S2, and if it is larger than "100", the divisional number Y is counted up to [+1], and then the number of the recording dot is renewed to the counted value A to return to the above Step S2.

When the counted value X is larger than the divisional number N at the above Step S3, the amount of conveyance of the recording paper 10 moved by the pulse motor 7 is calculated (Step S7) and the time during which the pulse motor 7 is driven for conveyance of the recording paper 10 and the divisional number for recording which is described in relation to FIG.4 are respectively determined (Step S8).

Figure 6:
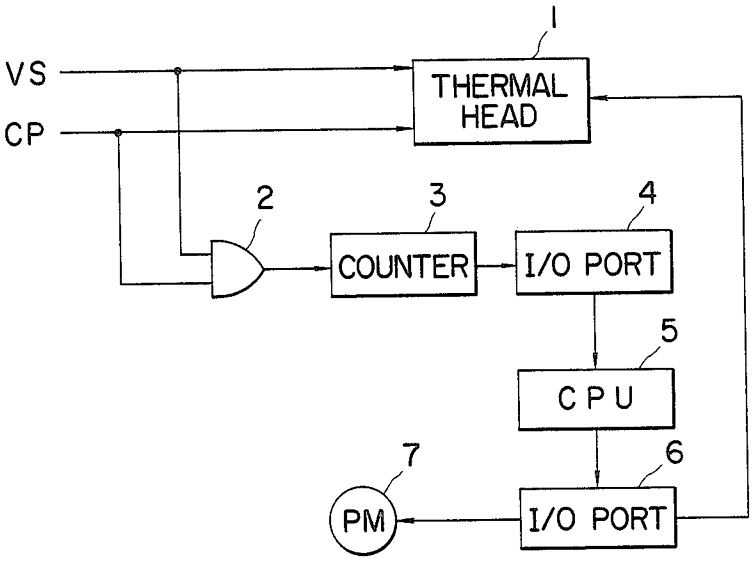
FIG. 6 is a block diagram to show an embodiment of a counter for recording dots according to this invention.

FIG.6 shows an embodiment of a detector for recording dots wherein image data VS is fed to a thermal head 1 as well as to an AND circuit 2 while a clock pulse CP is mimilarly fed to the thermal head 1 as well as the AND circuit 2. The output from the AND circuit 2 is counted by a counter 3, and the counted result is inputted to an I/O port 4 and then to a CPU 5. The CPU 5 determines the conveying time and the divisional number for recording, feeds a predetermined number of pulses to a pulse motor 7 via an I/O port 6, and gives strobing signals to the thermal head 1 at a timing corresponding to the computed number of blocks. Since the number of dots in blocks #1 through #N is 100 dots in the above embodiment, the counted values obtained by the counter 3 indicate percentage for each block as they are.

As described in detail in the foregoing, this invention method can reduce the electric current to be fed to a thermal head, drive several blocks of the thermal head simultaneously, and therefore enhance the speed of recording per line by dividing the heat resistor elements of the thermal head into a predetermined number, counting the number of recording heat resistor elements in each block and summing the number of the recording heat resistor elements from the first block so that a plurality of the heat resistor elements for each block can be driven with electric current simultaneously on the condition that the sum of number of the recording heat resistor elements in the plural blocks is not more than a predetermined value.

It should be understood that many modifications and adaptations of the invention will become apparent to those skilled in the art and it is intended to encompass such obvious modifications and changes in the scope of the claims appended hereto.

What is claimed is:

1. A recording control method for thermal recording which records image data on a recording medium with a line-type thermal head which comprises a plurality of heat resistor elements, which comprises the steps of:

dividing said heat resistor elements of said line-type thermal head into blocks in the number N;

counting the number of recording heat resistor elements in each block;

respectively summing the number of the recording heat resistor elements for each block in a predetermined direction;

sequentially recording data in a unit of one line by applying electric current to the recording heat resistor elements of each block simultaneously in a manner that the summed number is or less than a predetermined value; and controlling amount of displacement of said recording medium with the number of groups of blocks which record simultaneously and said divisional number N.

2. The recording control method as claimed in claim 1 wherein said predetermined direction is from one end of said line-type thermal head to the other end thereof;

3. The recording control method as claimed in claim 1 wherein said predetermined number is 100% of the number of the heat resistor elements in the blocks in number of N.

4. The recording control method as claimed in claim 1 wherein the conveyance of said recording medium is conducted by driving a pulse motor.

5. A recording control method for thermal recording which records image data on a sheet of recording paper with a line-type thermal head which is operativly divided into the number of N, which comprises the steps of;

setting a divisional number Y at "1" and increasing a block counting value by [+1];

judging whether or not a block counting value X is smaller than a divisional number N;

if the block counting value is smaller than the divisional number N, the block counting value is added to a value A of recording dots in an x-th block;

making the sum or [Z+A] to a counted value of the recording dots;

judging whether or not the counted value Z is less than a predetermined value;

repeating above operations if the counted value Z is smaller than said predetermined value;

increasing said divisional number Y by [+1], renewing the number of said recording dots to the value A and repeating above operations if the counted value Z is larger than said predetermined value;

computing amount of conveyance of said recording paper if said block counting value X is larger than said divisional number N; and determining time for conveying said recording paper and the number of said recording blocks.

6. The recording control method as claimed in claim 5 wherein said predetermined value is 100% of the number of dots in the blocks in the number N.

7. The recording control method as claimed in claim 5 wherein the conveyance of said recording paper is conducted by driving a pulse motor.

8. The recording control method as claimed in claim 7 wherein the number of recording dots is computed by obtaining AND of said image data and clock pulses, the pulse motor is fed with a predetermined number of pulses, and said line-typpe thermal head is fed with strobing signals corresponding to said computed number of divisions.

* * * * *